Dec. 31, 1957　　　　S. T. FREEMAN　　　　2,817,901
GUIDING INSTRUMENT FOR PRECISION IN RESTORATIVE DENTAL WORK
Filed March 12, 1956
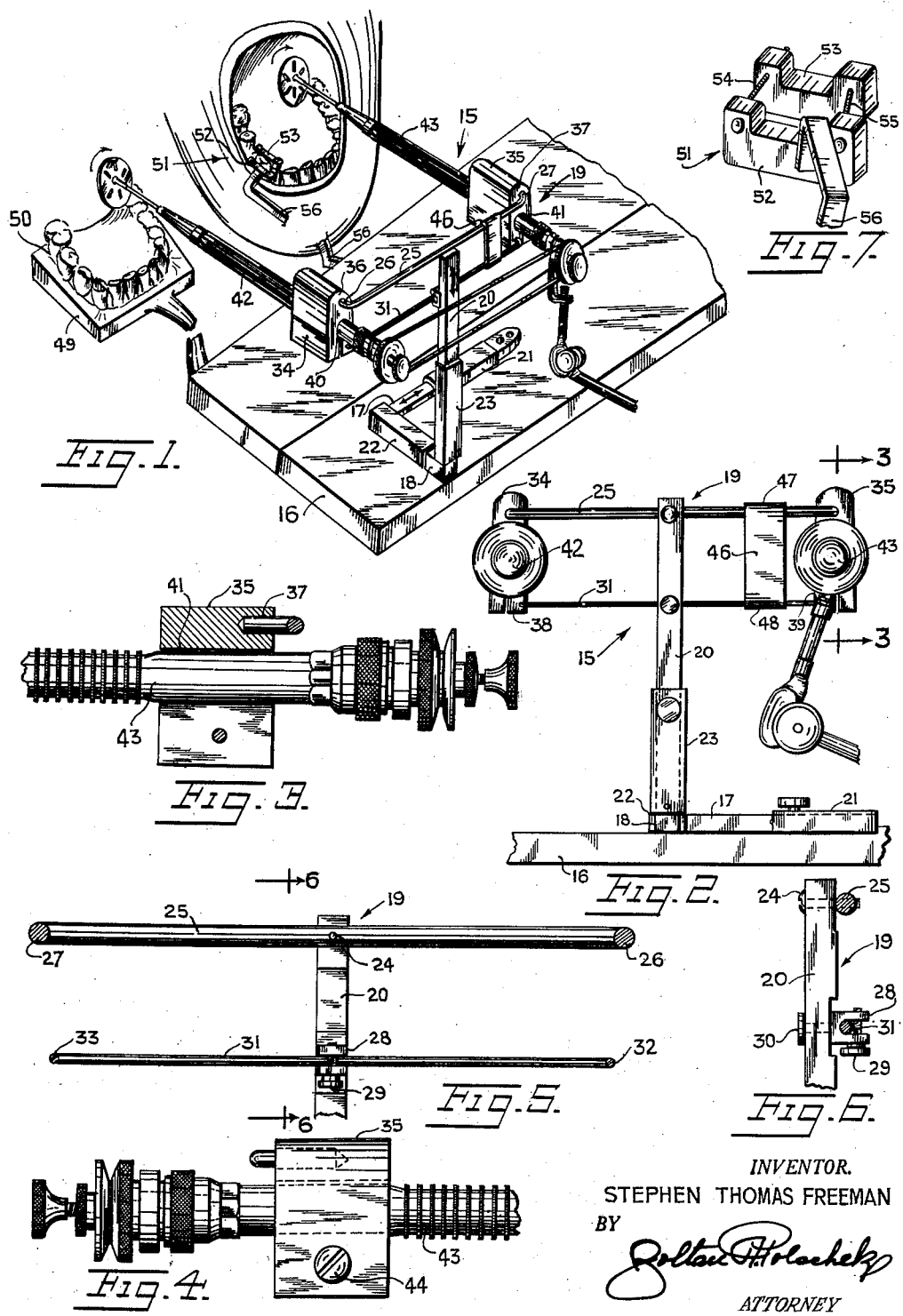
INVENTOR.
STEPHEN THOMAS FREEMAN
BY
*ATTORNEY*

United States Patent Office 2,817,901
Patented Dec. 31, 1957

2,817,901

GUIDING INSTRUMENT FOR PRECISION IN RESTORATIVE DENTAL WORK

Stephen Thomas Freeman, Gloversville, N. Y.

Application March 12, 1956, Serial No. 570,953

9 Claims. (Cl. 32—67)

This invention relates to new and useful improvements in dental instruments.

More particularly, the present invention proposes the construction of an improved dental drill guiding instrument for precision in restorative dental work which will hold two dental drills or hand pieces in spaced alignment for controlled movement in three planes so that work done inside a mouth can be duplicated simultaneously on an exact model of the teeth in that mouth outside the mouth.

As a further object, the present invention proposes forming the instrument with a base and a frame movably attached to the base for guided movement in three axial directions with a pair of drill holding clamps mounted on the frame in spaced aligned relation so that every cut in preparing teeth for abutments of fixed or removable bridges or the like can be precisely planed and executed, the instrument providing a guided cutting of tooth structure while the twin drill or hand piece does the same cutting outside the mouth on a model.

Another object of the invention proposes constructing an instrument with a system of clamps and bars guiding a pair of dental drills either of the conventional rotary dental engine type or the new ultrasonic machine type so that instead of free-hand preparation of a tooth for reconstruction every cut is guided and therefore more precise and less time consuming.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a pair of dental drills at work on a patient's teeth and held in a dental drill guiding device or instrument constructed and arranged in accordance with the present invention.

Fig. 2 is a rear view of the instrument shown in Fig. 1 with the belt connecting the drill pulleys removed for clarity.

Fig. 3 is a sectional view taken on line 3—3 of Fig. 2.

Fig. 4 is a side view of the structure shown in Fig. 3.

Fig. 5 is a front view of the frame shown in Figs. 1, 2, 3 and 4.

Fig. 6 is a sectional view taken on lines 6—6 of Fig. 5.

Fig. 7 is an enlarged perspective detail view of the tooth clamp.

Referring more particularly to the drawings, the dental drill guiding instrument of the present invention is designated generally by the reference numeral 15.

Instrument 15 has a base 16 on which is slidably mounted a pair of interconnected mounting members 17 and 18. Member 17 is mounted so as to move substantially laterally of the base 16 and member 18 is disposed to move substantially longitudinally of the base.

A frame 19 is provided with an upright support member 20 which is slidably and adjustably mounted on the mounting member 18. The mounting members 17 and 18 have casings 21 and 22 and the upright support member 20 has a casing 23. Mounting members 17 and 18 slide in two axial directions in their casings and upright support member 20 slides in a third axial direction in its casing 23. In this manner the frame is movably connected with the base 16 for guided movement in three axial directions.

Mounted on the frame 19, as by screw 24, is a crossbar 25 having angularly disposed end portions 26 and 27. Likewise mounted on frame 19, as by clamp 28 and screws 29 and 30 is a horizontal alignment and support rod 31 having angularly disposed end portions 32 and 33.

A pair of dental drill clamps 34 and 35 are mounted in aligned spaced relation on the crossbar 25. The clamps 34 and 35 have end openings 36 and 37 frictionally to secure the angularly disposed end portions 26 and 27 of the crossbar 25. Clamps 34 and 35 also have end openings 38 and 39 frictionally to secure the ends 32 and 33 of the rod 31.

Clamps 34 and 35 have drill openings 40 and 41 to hold dental drills or hand pieces 42 and 43 in spaced aligned relation. Clamping screws 44 are provided for the clamps 34 and 35.

A clasp member 46 having an upper flange 47 and a lower flange 48 removably secures and connects together the crossbar 25 and horizontal alignment and support rod 31.

A dental plate model clamp 49 is secured to the base 16 and holds a model 50 of the teeth of a particular patient adjacent that patient's mouth in an aligned and spaced relation while one of the drills or hand pieces is being used on the patient's tooth or teeth. A tooth clamp 51 (see Figs. 1 and 7) is connected with the base 16 to hold the base fixed with relation to the patient's tooth or teeth being worked on. Tooth clamp 51 has a pair of spaced members 52 and 53 which are held by and moved toward and away from one another by spaced screw members or rods 54 and 55. Members 52 and 53 may be made of plastic, hard rubber or similar material. A leg 56 connects clamp member 52 with the base 16.

The operation of the instrument is simple. A model of the patient's teeth is secured to the model clamp 49. When drill or hand piece 43 is being used in a patient's mouth, the exact cut is made simultaneously by drill or hand piece 42 on the model 50 outside the mouth. Movement of the drills or hand pieces may be made in any one of the three axial directions and movement of one drill will guide the movement of the other.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, and a horizontal alignment and support rod extending between and connected to said clamps.

2. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, a horizontal alignment and support rod extending between and connected to said clamps, and a clasp member removably to secure and connect together the crossbar and the horizontal alignment and support rod.

3. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, and a base, said upright support member being movably mounted on the base.

4. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, and a base, a pair of interconnected mounting members movably mounted in the same plane on the base, one of said mounting members being disposed to move substantially laterally of the base and the other mounting member disposed to move substantially longitudinally of the base, said frame being movably connected with one of said mounting members for guided movement of a pair of dental drills in said clamps in three axial directions.

5. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, a base, a pair of interconnected mounting members movably mounted in the same plane on the base, one of said mounting members being disposed to move substantially laterally of the base and the other mounting member disposed to move substantially longitudinally of the base, said frame being movably connected with one of said mounting members for guided movement of a pair of dental drills in said clamps in three axial directions, and a horizontal alignment and support rod extending between and connected to said clamps.

6. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, a base, a pair of interconnected mounting members movably mounted in the same plane on the base, one of said mounting members being disposed to move substantially laterally of the base and the other mounting member disposed to move substantially longitudinally of the base, said frame being movably connected with one of said mounting members for guided movement of a pair of dental drills in said clamps in three axial directions, a horizontal alignment and support rod extending between and connected to said clamps, and a clasp member removably to secure and connect together the crossbar and the horizontal alignment and support rod.

7. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, and a base, said upright support member being movably connected with the base for guided movement in three axial directions, and a dental plate model clamp connected with the base to hold a dental plate model adjacent a patient's mouth in an aligned spaced relation.

8. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, and a base, said upright support member being movably connected with the base for guided movement in three axial directions, a dental plate model clamp connected with the base to hold a dental plate model adjacent a patient's mouth in an aligned spaced relation, and tooth clamp means connected with the base to hold the plate model clamp in fixed aligned spaced relation to the teeth in a patient's mouth.

9. A dental drill guiding instrument for precision in restorative dental work comprising a frame having an upright support member and a crossbar, a pair of dental drill clamps mounted in aligned spaced relation on the crossbar and adapted to hold a pair of dental drills in aligned spaced relation, and a horizontal alignment and support rod extending between and connected to said clamps, said crossbar and horizontal alignment and support rod being movably mounted on the upright support member of the frame.

References Cited in the file of this patent

FOREIGN PATENTS 683,417   Great Britain _____ Nov. 26, 1952